United States Patent [19]

Economos et al.

[11] 3,738,422

[45] June 12, 1973

[54] HEAT DISSIPATING INSULATING MOUNTING

[75] Inventors: George Economos, Shorewood; David E. Ford, Jr., Milwaukee; John A. Fillar, Waukesha, all of Wis.

[73] Assignee: Allen-Bradley Company, Milwaukee, Wis.

[22] Filed: May 4, 1971

[21] Appl. No.: 140,089

[52] U.S. Cl. ................ 165/80, 165/185, 174/15 R, 317/234 A

[51] Int. Cl. .............................................. H01l 1/12

[58] Field of Search ............................. 165/80, 185; 317/234 A; 174/15 R

[56] References Cited

UNITED STATES PATENTS

| | | | |
|---|---|---|---|
| 2,817,048 | 12/1957 | Thuermel et al. | 317/234 A |
| 3,377,524 | 4/1968 | Bock et al. | 317/234 A |
| 3,513,362 | 5/1970 | Yamamoto | 317/234 A |
| 3,564,109 | 2/1971 | Ruechardt | 317/234 A X |
| 3,522,491 | 8/1970 | Coe | 317/234 A |
| 2,979,644 | 4/1961 | Salzer | 317/234 A |

FOREIGN PATENTS OR APPLICATIONS

| | | | |
|---|---|---|---|
| 1,468,888 | 1/1967 | France | 317/234 A |

*Primary Examiner*—Albert W. Davis, Jr.
*Attorney*—Arthur H. Seidel and Barry E. Sammons

[57] ABSTRACT

A mounting is shown for a heat generating electrical device, such as a power semiconductor, that functions to exchange heat between the heat generating device and a heat sink to which the mounting is attached. The mounting has a first metallic, heat conductive member upon which the semiconductor is supported, a second metallic, heat conductive member with means for attaching the mounting to a heat sink, a thin dielectric film sandwiched between and separating the two heat conductive members that exhibits good thermal conductivity, and an outer encapsulating jacket of resin that retains the assembly as a unitary whole.

2 Claims, 2 Drawing Figures

INVENTORS
David E. Ford, Jr.
George Economos
BY John A. Fillar

Arthur H. Seidel
ATTORNEY

HEAT DISSIPATING INSULATING MOUNTING

BACKGROUND OF THE INVENTION

This invention relates to the mounting of heat generating electrical devices that have exposed terminals operated at substantial voltage potentials from ground and from which heat must be drained to maintain the operating temperature within prescribed limits. Silicon controlled rectifiers, commonly called SCR's, are typical devices of this type, for most are constructed with an outer casing that is electrically hot and which functions as a mounting element through which heat is dissipated. The heat generated within the SCR must be exchanged continuously, and rapidly, so as to maintain the temperature of the SCR within a prescribed operating range.

Heretofore, a variety of constructions have been employed for mounting power semiconductors such as SCR's. Some of the smaller SCR's are provided with large metal tabs that are bolted directly to a heat sink, such as a chassis wall, to function as a heat exchanger between the interior of the SCR and the heat sink. Some SCR's are provided with a flat butt like surface, as a part of an outer casing, which is pressed directly against a mounting member, such as a chassis wall, for transferring heat away from the SCR. For SCR's of larger ratings elaborate mountings have been developed that include numerous heat radiating fins for the transfer of heat to ambient air. Such fins may comprise radially arranged, cast metal fins of expensive and space consuming construction, and because the heat to be dissipated must be transferred to an ambient the space required for housing the structure becomes very large. The fin type assemblies are also electrically insulated from the cabinets, or chassis, in or upon which they are mounted, so that the voltage potentials of the SCR casings are adequately isolated from other apparatus.

Still another arrangement for the butt mounted SCR's is to adhere them to a thin metal plate, and then mount the plate on a chassis with an electrical insulating film between the plate and chassis to keep the electrically hot SCR isolated from the chassis. In this fashion, the chassis is employed as a heat sink, but this arrangement has not been wholly satisfactory because high mechanical strength is lacking, and the film introduces excessive thermal resistance, particularly if a substantial thickness is used in order to obtain adequate breakdown voltage ratings for the insulation.

These various SCR mountings are illustrated in the General Electric SCR Manual, Fourth Edition of 1967. It would be desirable to provide heat dissipating mountings for larger SCR's, and like devices, of greatly reduced bulk from the cooling fin arrangements that have been used heretofore. It would further be desirable to have such mountings utilize a chassis, or metal blocks as heat sinks, so that conduction of heat to an ambient need not be relied upon as the method of heat dissipation. A reduction in space can then be achieved, and expensive fin structures can be obsoleted in favor of less expensive mountings. The present invention is directed to the fulfillment of these objectives, and to the additional objective of attaining high voltage ratings without introduction of excessive thermal resistance between the SCR and the heat sink. Such objectives are attained in the provision of small, individual mountings for SCR's which facilitate installation by reason of their compactness in size.

SUMMARY OF THE INVENTION

The present invention relates to heat dissipating mountings for heat generating electrical devices, such as power semiconductors, and it more specifically resides in a mounting having a first heat conductive member for supporting the electrical device, a second heat conductive member adapted for securing the entire unit to a heat sink, electrical insulation in the form of a thin dielectric film sandwiched tightly between the heat conductive members, and an encapsulating jacket molded around the members and film to retain them in tightly assembled position.

The mounting of the invention presents a direct heat exchange path between a heat generating element, such as an SCR, and a heat sink that may be in the form of a cabinet or chassis, or other suitable structure capable of receiving, spreading and dissipating heat. The mounting is an intermediary, that must function to rapidly draw heat away from the heat source and deliver such heat to the heat sink proper. It must also function to electrically insulate the heat sink proper from the heat source, and such insulation must be capable of withstanding high voltages, so that electrical ratings will ensure safety upon occurrence of abnormally large transient potentials. A mounting must further have the attributes of a rugged item of hardware. An SCR must be securely fastened to it, and the mounting, in turn, is tightly attached to the heat sink. Threaded connections are preferable, and the torques and pressures created in making a tight assembly of the components must be withstood.

In developing the invention, a dielectric for isolating the electrically hot power semiconductor that exhibits low thermal resistance had to be selected. Low thermal resistance is enhanced by a high dielectric strength that permits the use of thin sections. However, the maintenance of high breakdown voltages is not solely dependent upon dielectric strength. The electrical paths between the heat conductive members, which are isolated from one another by the film of dielectric, must be of a length that currents do not flow around the dielectric in a shunting manner. It is a particular feature of a preferred form of the invention to extend the dielectric film beyond the associated heat conductive members to increase current paths, and further to embed the film in a surrounding jacket for physical support and to minimize the possible occurrence of shunting currents.

Objectives of the present invention are to provide a heat dissipating mounting for electrical devices that has: good electrical insulating qualities, high mechanical strength to withstand torques encountered in tightly assembling the mounting with a heat sink and the electrical device, tight retention of a dielectric film that insulates heat conductive components, electrical insulation that will withstand large voltage surges, the ability to operate at elevated temperatures without degradation, the ability to operate under adverse humidity conditions without decrease in electrical insulating characteristics, low junction temperatures at the interfaces of the components comprising the device, and long life.

The foregoing and other objects and advantages of the invention will appear from the following description. In the description reference is made to the accompanying drawing which forms a part hereof, and in which there is shown by way of illustration and not of limitation a preferred embodiment of the invention. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENT

Figure 1:
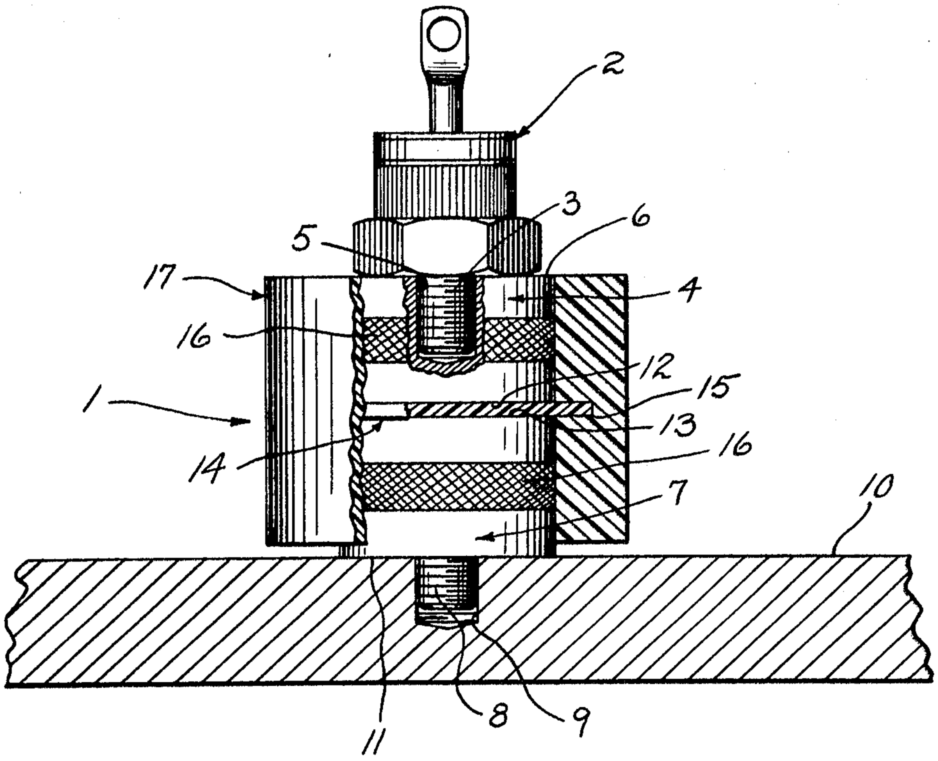
FIG. 1 is a view in elevation with parts broken away and in section of a heat dissipating insulating mounting embodying the invention that has an SCR secured at its top and which is attached to a chassis wall.
Figure 2:
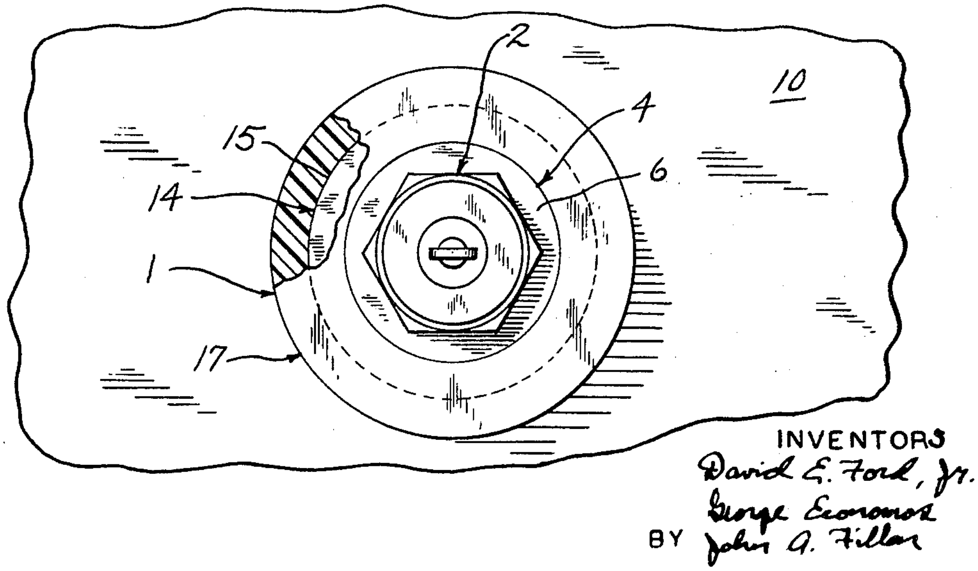
FIG. 2 is a plan view of the heat dissipating insulating mounting of FIG. 1 with a portion broken away to show interior construction.

In FIGS. 1 and 2 there is shown a heat dissipating insulating mounting of the invention which is identified by the numeral 1, and seated upon the mounting 1 is a heat generating electrical device in the form of an SCR 2. An SCR is a semiconductor that generates a substantial amount of heat in normal operation that must be dissipated continuously for successful operation. If adequate cooling is not provided the internal temperature of an SCR may rise to a level that permanent damage occurs, and such damage can lead to circuit failure. The outer, metallic case of the SCR 2 is electrically hot, and since the case includes a threaded stud 3 for direct attachment of the SCR 2 to a mounting it is necessary to provide a mounting 1 that serves the function not only of rapidly conducting heat away from the SCR 2, but also of electrically insulating the SCR 2 from both other circuit elements and the chassis of the circuit. The heat dissipating insulating mounting 1 is constructed to afford these functions.

Objectives mounting 1 has a circular cylindrical, metallic support member 4 that is highly heat conductive. The member 4 has an upwardly opening, centrally located, tapped mounting socket 5 which receives the SCR stud 3. The support member 4 also has a flat upper face 6 against which the undersurface of the SCR 2 is brought down tightly, to thereby pass heat generated within the SCR 2 to the heat conductive mounting member 4 through a substantial area of surface contact, as well as through the stud 3.

Directly beneath, and concentrically aligned with the support member 4 is a circular cylindrical, metallic heat transfer member 7 that is of the same diameter as the member 4. The heat transfer member 7 has an integral, threaded mounting stud 8 protruding from its lower surface, and this mounting stud 8 is turned into a mating, threaded opening 9 in a chassis wall 10 that functions as a heat sink. The underface 11 of the heat transfer 7 is smooth and flat, to provide for a large bearing surface area that is brought up tight against the chassis wall 10 to form an effective heat transferable junction with the heat sink.

Sandwiched between a downwardly facing flat inner surface 12 of the member 4 and an upwardly facing flat inner surface 13 of the member 7 is a thin dielectric film 14. The film 14 provides electrical insulation between the heat conductive members 4 and 7, so that voltage potentials of the SCR 2 are isolated from the chassis wall 10. The dielectric film 14 also has the property of conducting heat from member 4 to member 7 without introducing excessive thermal resistance.

The insulating film 14 must have a large breakdown voltage rating, and to achieve this rating a high dielectric strength is required, so that the cross section thickness may be kept thin. Then, adequate heat transmission characteristics for rapidly passing quantities of heat to be dissipated, without requiring an excessive surface area through which the heat must pass, can be achieved. A polyimide film has been found preferable for these purposes. Such a film may be obtained under trademark KAPTON from E. I. DuPont de Nemours & Company, such material being available as a plain film (type H), or with a thin coating of FEP-fluorocarbon resin (type F) which enhances bonding to itself. When layers of the film are stacked to obtain greater voltage ratings the FEP coated film may be used to adhere the layers together in a tight union with minimal voids between layers. More ideally, a single layer of proper thickness would eliminate the necessity of stacking layers of thinner film.

For adhering the polyimide film to the heat conductive members 4, 7 an adhesive is first applied to the film. A polyimide surface is receptive to a number of adhesives, such as, for example, polyamide-imides, fluorocarbons, epoxies, polyesters and phenolics. The polyamide-imide type adhesive has been found satisfactory, and it is first applied to the film and partially cured to the B-stage. Then the film is sandwiched between the members 4, 7 with a sliding movement, to inhibit air pocket formation, and tightly clamped. Final curing is then carried out.

The circular disc of dielectric film 14 has an outer margin 15 that extends radially outward of the cylindrical boundary faces of the members 4 and 7. This radial extension presents an increased length of path along the surface of the film 14 from one member 4, 7 to the other member 4, 7. This inhibits breakdown currents from shunting around the film 14, to thereby enhance and maintain the electrical insulating characteristic of the construction.

Each of the members 4 and 7 has a knurled surface area 16, and a molded jacket 17 surrounds and encapsulates the outer cylindrical surfaces of the members 4, 7 and the extended margin 15 of the dielectric film 14. This jacket 17 is also in contact with the surface areas 16 to form a strong union with the members 4, 7, and the jacket is formed of a suitable resin, such as an epoxy, which has requisite characteristics of strength, electrical properties and ease of handling. This molded jacket 17 performs the functions of enhancing the electrical resistance between the members 4 and 7, shielding the metallic parts of the assembly so that it may be handled with greater safety, and providing mechanical strength that holds the assembled parts together.

With respect to the mechanical strength afforded by the jacket 17, it maintains the pressure between the interfaces of the dielectric film 14 and the surfaces 12 and 13 which were developed when bonding the parts together. Optimum heat transfer between parts depends on adequate contact between the surfaces of the parts. This normally calls for a pressure between the parts to minimize minute voids and to increase the actual area of contact. While surfaces may appear smooth and flat to the eye, microscopically there are small deformations that must be pressed and flattened to lower the thermal resistance between the parts. Such pressure can be developed between the members 4 and 7 during assembly, and to maintain the pressure the molded jacket 17 intimately grips the knurled surface areas 16 to inhibit members 4 and 7 from receding from one another and from the dielectric film 14.

The molded jacket 17 also supplies strength that allows substantial torque to be exerted upon the assembly of the invention. Such torque is applied in bringing the mounting stud 8 and the underface 11 down tight upon the heat sink afforded by the chassis wall 10, and also in tightly mounting the SCR 2 upon the member 4. The assembly of the invention is a hardware type item that is subject, at times, to abusive treatment, and its advantage of being a unitary item capable of withstanding such abuse arises from the presence of the resin jacket 17.

It is, quite clearly, desirable to select a material of maximum thermal conductivity for the members 4 and 7. Copper is therefore most suitable, but cost considerations may require some other metal. If aluminum is selected caution must be exercised in not using the mounting 1 under corrosive conditions where galvanic action between the aluminum and the copper of the SCR 2 may cause a deterioration between the interface areas of the SCR 2 and the support member 4. The support member 4 and the heat transfer member 7 are of such size as to have some heat sink characteristics, although they are primarily intended as heat interchange elements for conducting heat to the heat sink provided by the chassis wall 10. They must have a size and bulk sufficient for mounting the SCR 2, and the diameter of the members 4, 7 should be adequate to spread the heat out over a substantial area as it approaches the dielectric film 14. Because of the inherent nature of a dielectric film, its thermal resistance is substantially greater than that of the metal of the members 4, 7 and by spreading out the heat over a substantial area the thermal resistance of the film 14 is materially decreased. Such design consideration together with the breakdown voltage rating to be obtained should be taken into account, so that there is a matching of the heat dissipating capacity to the heat generating characteristics of the SCR. As has been indicated above, thermal resistance between interfaces of the component parts must be minimized, and at each interface thermally conductive heat sink grease should be applied. Various greases are available, and should be applied between the SCR 2 and support member 4, and between the underface 11 and the chassis wall 10.

When in use, the invention provides a rugged mounting that can be matched in size and electrical ratings to the heat generating device which it supports. The outer surface configuration of the mounting can be altered from that shown in the drawing. For example, instead of a circular cylindrical outer shape, the mounting might be of a hexagonal shape, or have flat faces, which could be engaged by a wrench or other tool. Also, the mounting might be adapted to seat two or more heat generating devices that are at a common potential level. Of particular advantage in the use of the invention is the elimination of reliance upon heat conduction to ambient air as a means of heat dissipation. As a result, SCR's can be mounted in a small space and in enclosed cabinets or housings which have dust tight and explosion proof ratings.

We claim:

1. In a heat dissipating insulating assembly for a heat generating electrical device, the combination comprising:

a metallic support member having an exposed upper face portion for direct mounting engagement with the heat generating electrical device to receive heat therefrom, an inner face opposite said upper face and across which such heat is to be transferred, and circumferential outer surfaces extending between the upper and inner faces;

a metallic heat transfer member having an inner face in a position directly facing and closely spaced from the inner face of said support member for transfer of heat between the inner faces, an attachment portion for securement of the assembly to a heat sink, and circumferential outer surfaces extending between the attachment portion and the inner face;

an electrical insulating layer of thin cross section disposed tightly between the inner faces of said members, which layer has a circumferential margin extending beyond the boundaries of said inner faces; and a molded, resinous jacket encircling the circumferential outer surfaces of said support and transfer members which encapsulates the circumferential margin of said insulating layer, such jacket holding said support and transfer members and said insulating layer tightly against one another.

2. An assembly as in claim 1 wherein said support and heat transfer members are cylinders of like cross section aligned with one another.

* * * * *